(12) United States Patent
Jones

(10) Patent No.: US 9,021,464 B2
(45) Date of Patent: Apr. 28, 2015

(54) METHODS, SYSTEMS AND COMPUTER PROGRAM PRODUCTS FOR RATIONALIZATION OF COMPUTER SYSTEM CONFIGURATION CHANGE DATA THROUGH CORRELATION WITH PRODUCT INSTALLATION ACTIVITY

(75) Inventor: Mark Jones, Fall City, WA (US)

(73) Assignee: NetIQ Corporation, Houston, TX (US)

(*) Notice: Subject to any disclaimer, the term of this patent is extended or adjusted under 35 U.S.C. 154(b) by 1701 days.

(21) Appl. No.: 11/831,089

(22) Filed: Jul. 31, 2007

(65) Prior Publication Data

US 2008/0034363 A1 Feb. 7, 2008

Related U.S. Application Data

(60) Provisional application No. 60/821,613, filed on Aug. 7, 2006.

(51) Int. Cl.
G06F 9/445 (2006.01)
G06F 9/44 (2006.01)

(52) U.S. Cl.
CPC .... *G06F 8/60* (2013.01); *G06F 8/71* (2013.01)

(58) Field of Classification Search
CPC .............. G06F 8/61; G06F 8/62; G06F 8/60; G06F 8/71

USPC .................................................. 717/121, 174
See application file for complete search history.

(56) References Cited

U.S. PATENT DOCUMENTS

| | | | |
|---|---|---|---|
| 7,010,757 B2* | 3/2006 | Stana et al. | 715/823 |
| 7,203,696 B2* | 4/2007 | Atm | 1/1 |
| 7,765,592 B2* | 7/2010 | Wang et al. | 726/22 |
| 7,774,657 B1* | 8/2010 | Hardman | 714/47.1 |
| 2003/0208573 A1* | 11/2003 | Harrison et al. | 709/223 |
| 2004/0044693 A1* | 3/2004 | Hadley et al. | 707/200 |

\* cited by examiner

*Primary Examiner* — Wei Zhen
*Assistant Examiner* — Lanny Ung
(74) *Attorney, Agent, or Firm* — Myers Bigel Sibley & Sajovec

(57) ABSTRACT

Methods for correlating configuration change data to an application installation/removal event for a computer system are provided. Configuration change data records for the computer system are retrieved. The application installation/removal event is identified. Correlation criteria are determined. A plurality of the configuration change data records are automatically identified as being associated with the identified application installation/removal event based on the determined correlation criteria and a characteristic of the configuration change data records.

20 Claims, 3 Drawing Sheets

METHODS, SYSTEMS AND COMPUTER PROGRAM PRODUCTS FOR RATIONALIZATION OF COMPUTER SYSTEM CONFIGURATION CHANGE DATA THROUGH CORRELATION WITH PRODUCT INSTALLATION ACTIVITY

RELATED APPLICATION

This application claims the benefit of and priority to U.S. Provisional Patent Application No. 60/821,613, entitled "Methods, Systems And Computer Program Products For Rationalization Of Computer System Configuration Change Data Through Correlation With Product Installation Activity" filed Aug. 7, 2006, the disclosure of which is hereby incorporated herein by reference as if set forth in its entirety.

BACKGROUND OF THE INVENTION

The present invention relates generally to computer systems, and more particularly, to monitoring of changes on computer systems.

As the popularity of the computer networks continues to increase, so does the challenge of controlling the systems making up the network where a variety of changes may be implemented over time by different people in an uncoordinated manner. Such changes may increase the challenges for network managers in addressing problems encountered by users and maintaining a desired service level for the network. Thus, network managers may continue to look for ways to monitor changes to and the performance of the network and debug the network for any problems that may arise.

It is known how to monitor computer configuration change data to help manage such computers. However, when monitoring computer configuration change data, a very large volume of changes may be detected over time. As such, it may be difficult to understand the causes and/or potential impact of such changes.

SUMMARY OF THE INVENTION

Embodiments of the present invention provide methods for correlating configuration change data to an application installation/removal event for a computer system. Configuration change data records for the computer system are retrieved. The application installation/removal event is identified. Correlation criteria are determined. A plurality of the configuration change data records are automatically identified as being associated with the identified application installation/removal event based on the determined con-elation criteria and a characteristic of the configuration change data records.

In other embodiments, identifying the application installation/removal event includes retrieving an identification of currently installed software components of the computer system and comparing the retrieved identification of currently installed software components to a previously generated identification of installed software components to identify the application/removal event. An operating system of the computer system may maintain records of currently installed software components and retrieving an identification may include retrieving the records of currently installed software components and comparing the retrieved identification may be followed by saving the retrieved identification of currently installed software components as the previously generated identification of installed software components. For example, the operating system may be a Windows® operating system and the records of currently installed software components may be maintained by an Add/Remove program feature of the operating system.

In further embodiments, the method further includes an operating system of the computer system generating the configuration change data records. A configuration management program may generate a portion of the configuration change data to track configuration changes that are not tracked by the operating system. The configuration change data may track changes including file changes, directory changes and/or registry changes.

In other embodiments, the retrieved identification of currently installed software components includes an identification of directory locations of uninstall programs associated with the respective installed software components and ones of the configuration change data records include an identification of a directory location and/or a parent of the directory location associated with the respective ones of the configuration change data records. Automatically identifying includes automatically identifying ones of the configuration change data records having a directory location and/or a parent of the directory location corresponding to the directory location of the uninstall program of the identified application installation/removal event as being associated with the identified application installation/removal event.

In further embodiments, retrieving an identification and comparing the retrieved identification are carried out at a time. The time is associated with the identified application installation/removal event and ones of the configuration change data records also have an associated time. Automatically identifying includes automatically identifying ones of the configuration change data records having an associated time corresponding to the time associated with the identified application installation/removal event as being associated with the identified application installation/removal event. Determining correlation criteria may include determining a time period range to be used in automatically identifying ones of the configuration change data records having an associated time corresponding to the time associated with the identified application installation/removal event as being associated with the identified application installation/removal event.

In yet other embodiments, identifying the application installation/removal event includes identifying a plurality of application installation/removal events. Retrieving an identification and comparing the retrieved identification are repeatedly carried out responsive to detection of execution of an application install or an application uninstall by the operating system and/or at scheduled times to identify the plurality of application installation/removal events.

In further embodiments, determining correlation criteria includes identifying a directory tree range criterion, a registry key tree range criterion and/or a time period range to be used in automatically identifying the plurality of configuration change data records. Determining correlation criteria may include prompting a user to provide the correlation criteria before automatically identifying the plurality of configuration change data records. Prompting the user may include prompting the user for a desired level of risk that an individual configuration change data record will incorrectly be associated with the identified application installation/removal event. The directory tree range criterion, registry key tree range criterion and/or time period range may be decreased for lower desired levels of risk and increased for higher desired levels of risk.

In other embodiments, automatically identifying is preceded by receiving a correlation request from a user and automatically identifying is carried out responsive to the received correlation request. Identifying the application installation/removal event may include identifying a plurality of application installation/removal events and automatically identifying may include automatically identifying groups of the configuration change data records as being associated with respective ones of the plurality of application installation/removal events. Automatically identifying may be followed by reporting the identified groups to the user.

In yet other embodiments, systems for correlating configuration change data to an application installation/removal event for a computer system are provided. A configuration change database includes a plurality of configuration change data records for the computer system, ones of which track changes on the computer system. An installed application list identifies currently installed applications on the computer system. An applications historical database includes identifications of application install/removal events for the computer system over a period of time. Correlation criteria are provided for use in correlating the configuration change data records with the application install/removal events. An application control engine is configured to install and/or remove applications and to update the installed application list. A logic engine is configured to generate the identifications of application install/removal events based on the installed application list and to identifying a plurality of the configuration change data records as being associated with the identified application installation/removal events based on the correlation criteria and a characteristic of the configuration change data records.

In further embodiments, computer program products for correlating configuration change data to an application installation/removal event for a computer system are provided, the computer program products including a computer-readable storage medium having computer-readable program code embodied in said medium. The computer-readable program code includes computer-readable program code that retrieves configuration change data records for the computer system, computer-readable program code that identifies the application installation/removal event, computer-readable program code that determines con-elation criteria and computer-readable program code that automatically identifies a plurality of the configuration change data records as being associated with the identified application installation/removal event based on the determined correlation criteria and a characteristic of the configuration change data records.

DETAILED DESCRIPTION OF THE INVENTION

Figure 1:
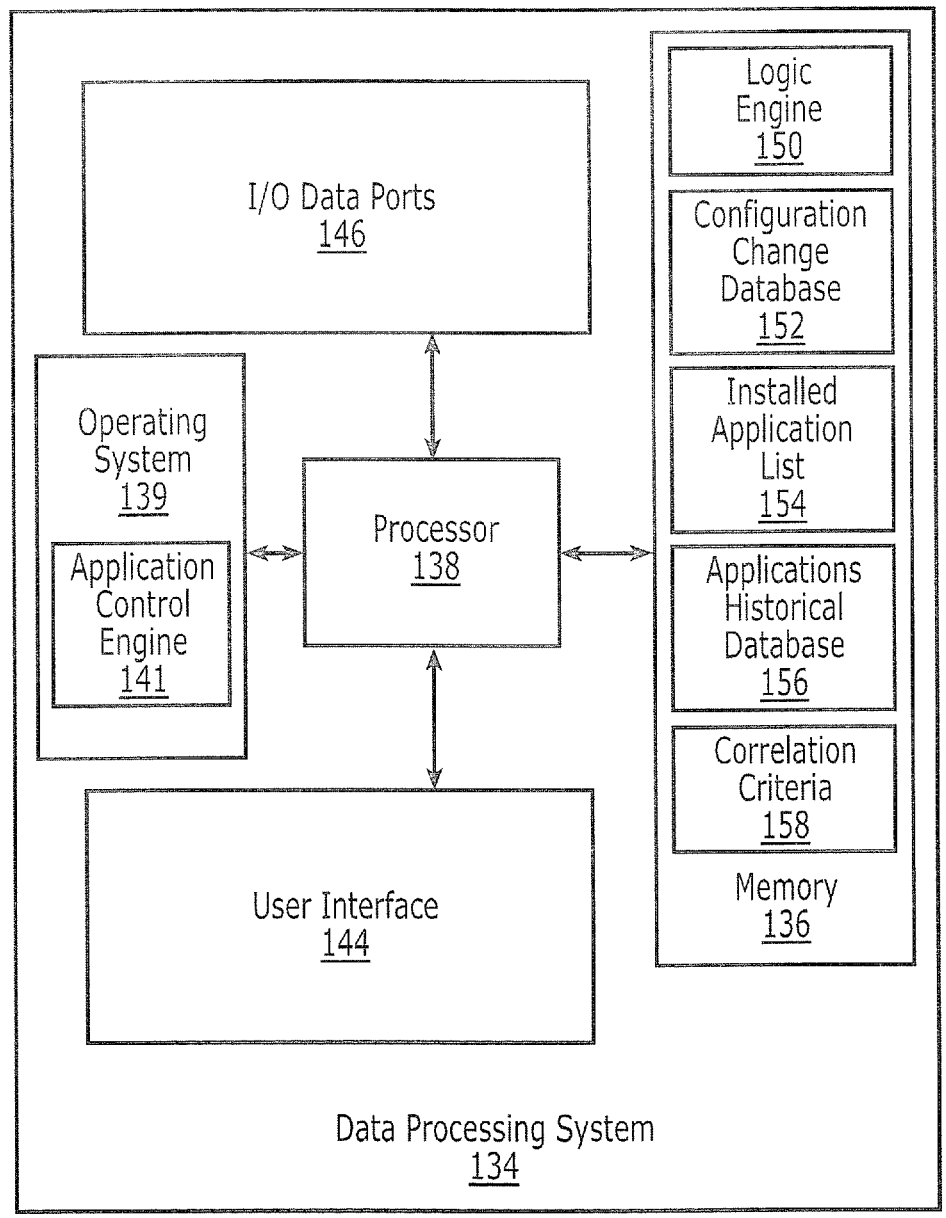
FIG. 1 is a block diagram of a data processing system suitable for use as a system for correlating configuration change data to an application installation/removal event according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

In some embodiments of the present invention, configuration change data may be correlated with records regarding the installation and/or removal of software components. Such a correlation of potentially voluminous computer configuration change data with data regarding the installation and/or removal of software components may provide a deeper insight into the source of these changes, which may allow a network administrator to better understand their potential impact or otherwise identify issues.

When a change monitoring program sees a large number of changes over a short time period, it may be difficult to understand the source, meaning, and/or impact of those changes. Such a series of changes may well be caused by the installation and/or removal of a software component, which is an event that may be much easier to understand and evaluate. This is generally even more likely to be the case when the observed changes are concentrated in a specific area, such as a single program directory or directory sub-tree and/or a single registry key or sub-tree. Most generally used computer operating systems maintain records regarding currently installed software components. In some embodiments of the present invention, by monitoring a computer system's records of installed software components, observed groups of related changes can be correlated with the actual system records regarding what software components were installed and/or removed on the machine at that time. This information may be used to confirm that a series of changes represent a software component installation and/or removal (or refuting such a hypothesis). Furthermore, this determination may be used to assist in evaluating the risk and acceptability of this change. The determination that a series of changes represent a software component installation/removal may also be used to reduce the number of items to be evaluated by a network administrator by grouping a potentially large number of configuration change records into a single event for consideration by the network administrator.

In some cases, where changes caused by installation are wide-spread, and when there is also other activity going on at the same time, it might be difficult to separate changes caused by a software component installation from other changes that might be occurring. In some embodiments, various selectable criteria may be utilized for determining when to associate such configuration change records with a common software installation/removal event. Such criteria may be selected considering both the risk of failing to identify such an event and/or the risk of incorrectly grouping a configuration change data record with such an event.

In some embodiments of the present invention, install and uninstall features already included in an operating system may be used in correlating configuration changes to software installation/removal events. By way of illustrative example, embodiments for evaluation of Windows® operating system based computer systems will now be further discussed. Such operating systems generally maintain a database or file including a listing of many configuration changes that have occurred on the computer system. In addition, 3rd party configuration management programs may augment this list with additional configuration changes, which are not natively tracked by the operating system. Identified configuration changes may include, for example, file changes, directory changes and/or registry changes. After a relatively limited period of use, such a listing may include an extremely large number of entries, as even minor changes are typically included. For example, each time an individual file is saved on the computer system a record may be generated and added to the listing.

In addition, the Windows® operating system includes a Control Panel interface including an Add/Remove program interface option. The Add/Remove program feature maintains an installed application list identifying currently installed applications. In addition, respective programs typically include an uninstall program stored in an associated directory. The directory location of the uninstall program is known to the Add/Remove program. Furthermore, this directory location and/or a parent of the directory location is generally associated with some or even all of the configuration changes that occurred on installation of the respective application.

In some embodiments of the present invention, a logic engine may be provided that generates historical records of application changes on a computer system and/or correlates such events to configuration change data records of the computer system. The logic engine may be implemented as an application or applications executing on the computer system and/or be integrated in the operating system of the computer system. The logic engine may also be implemented as code executing remotely on another network device having access to installed application and configuration change information about the computer system. As such, logic engines according to some embodiments of the present invention may correlate large numbers of configuration change data records with a more limited number of application installation/removal events. For example, an installation of the Microsoft OFFICE® may generate upwards of 50,000 configuration change records, all of which may be grouped to a single event for use by a network administrator in reviewing configuration change data from the computer system to identify problems or the like. As such, the job of the network administrator may be greatly simplified using various embodiments of the present invention.

Referring now to FIG. 1, an exemplary embodiment of devices, for example, a client computer device, server computer device or the like or other data processing system 134, configured as a system for correlating configuration change data to an application installation/removal event in accordance with some embodiments of the present invention will be discussed. The data processing system 134, which may be incorporated in, for example, a personal computer, a PDA, a wireless terminal/phone, or the like, may include a user interface 144, including, for example, input device(s) such as a keyboard or keypad, a display, a speaker and/or microphone, and a memory 136 that communicate with a processor 138. The data processing system 134 may further include an I/O data port(s) 146 that also communicates with the processor 138. The I/O data ports 146 can be used to transfer information between the data processing system 134 and another computer system or networks that may be associated with a communications service provider or user communication devices using, for example, an Internet Protocol (IP) connection. An operating system 139 is also illustrated separately from the memory 136 in FIG. 1. However, the operating system code may be stored in whole or in part in the memory 136. These components may be conventional components, such as those used in many conventional data processing systems, which may be configured to operate as described herein.

As shown in the embodiments of FIG. 1, the memory 136 includes a logic engine 150, a configuration change database 152, an installed application list 154, an applications historical database 156 and correlation criteria 158. The configuration change database 152 includes the plurality of configuration change data records for the computer system, ones of which track changes on the computer system. Change records may, for example, reflect file changes, directory changes and/or registry changes. The installed application list 154 identifies currently installed applications on the computer system. Such a list may be maintained, for example, by an Add/Remove program feature of the computers operating system. The applications historical database 156 includes identifications of application install/removal events for the computer system over a period of time. The applications historical database 156 may be generated in whole or in part by the logic engine 150 as will be described herein. The correlation criteria 158 may include values for use in correlating configuration change data records in the configuration change database 152 with the application install/removal events detected by the logic engine 150.

In some embodiments, the logic engine 150 is configured to generate the identifications of application install/removal events based on the installed application list 154. For example, as described further herein, the current list of installed applications identified by the installed application list 154 may be compared to a recent historical reference previously determined list of installed applications by reference to the applications historical database 156. The logic engine 150 is further configured to identify a plurality of the configuration change data records in the configuration change database 152 as being associated with the identified application installation/removal event or events based on the correlation criteria 158 and on a characteristic of the configuration change data record in the configuration change database 152. For example, both the configuration change data record and the identified application installation/removal event or events may have an associated directory or directory tree, registry or registry tree and/or time or time range of occurrence.

The embodiments illustrated in FIG. 1 further show an application control engine 141 within the operating system 139. The application control engine 141 is configured to install and/or remove applications and to update the installed application list 154. For example, the operating system 139 may be a Windows® operating system and the application control engine 141 may be an Add/Remove program feature of the operating system. The logic engine 150 stored in the memory 136 and the application control engine 141 may be executed by the processor 138 and may use the database, list and criteria 152, 154, 156, 158, which are also available to the processor 138.

While shown as resident in the memory 136 in the embodiments of FIG. 1, it will be understood that the respective database and module (engine) features may be implemented, for example, as part of the operating system 139, as application programs, as components of a dynamic link library or the like of the data processing system 134 so as to be executed in whole or in part by the processor 138. Accordingly, the particular groupings illustrated in FIG. 1 are solely for the purposes of explanation of the present invention.

Figure 2:
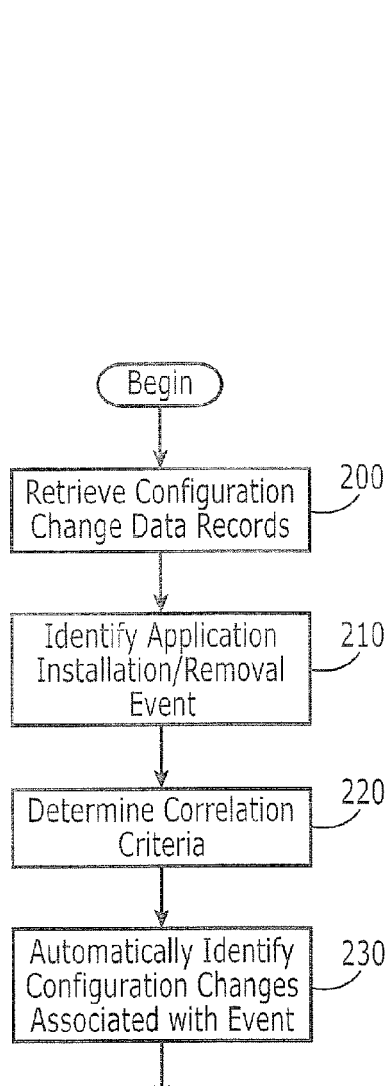
FIGS. 2-4 are flowcharts illustrating operations for correlating configuration change data to an application installation/removal event according to some embodiments of the present invention.
Figure 3:
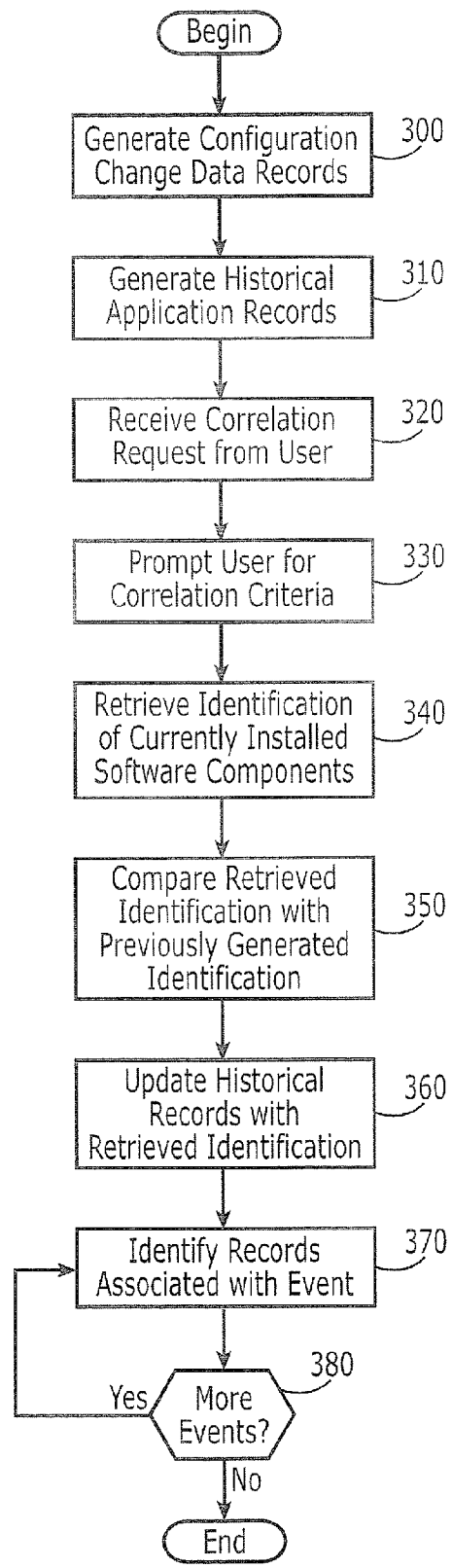
Figure 4:
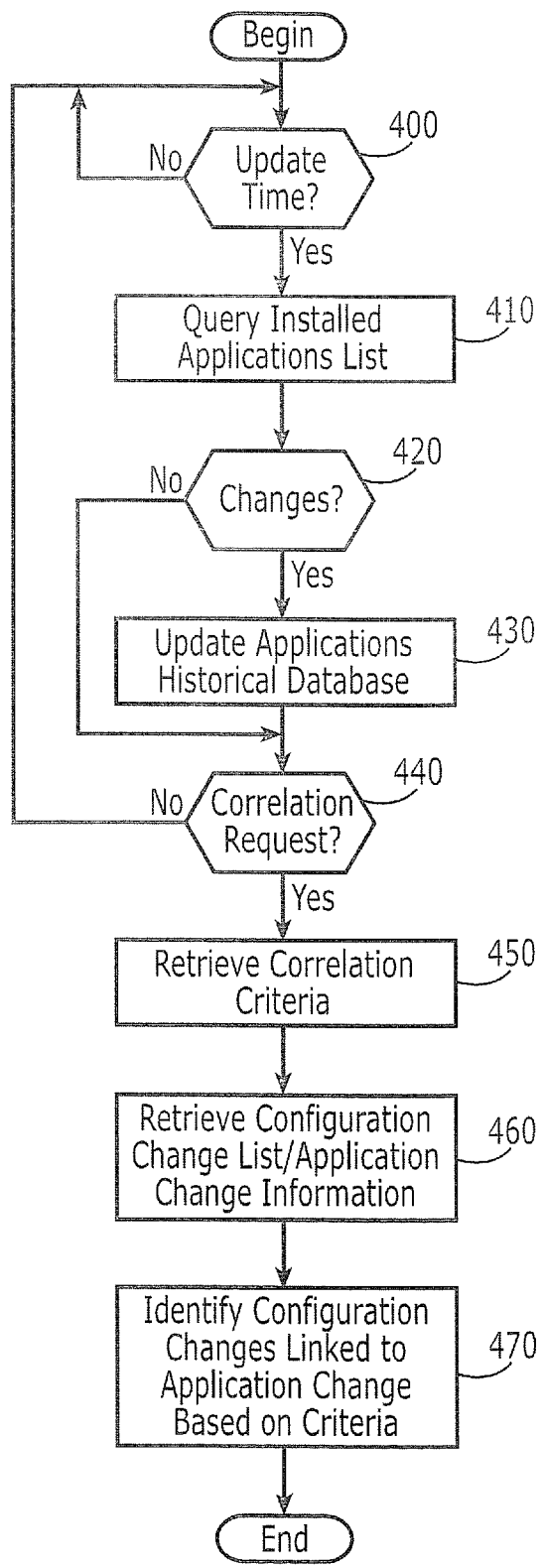

Computer implemented methods of correlating computer system configuration change data with application installation or removal events according to various embodiments of the present invention will now be described with reference to the flowchart illustrations of FIGS. 2-4. Referring first to the embodiments illustrated in the flowchart of FIG. 2, operations begin with retrieving configuration change data records for the computer system (Block 200). The application installation/removal event is identified (Block 210). In some embodiments, it will be understood that identifying the application installation/removal event includes identifying a plurality of application installation/removal events. For example, an application installation/removal event may be identified in a computer system operating under the Windows® Operating System by comparing records of currently installed software components maintained by an Add/Remove program feature of the operating system with a historical listing of installed applications so as to detect changes, either in the addition of new applications or the deletion of previously present applications.

Correlation criteria are determined (Block 220). Operations at Block 220 may include identifying a directory tree range criterion, a registry key tree range criterion and/or a time period range to be used in automatically identifying what configuration change data records correspond to a particular application installation/removal event. At Block 230, a plurality of the configuration change data record retrieved at Block 200 are automatically identified as being associated with the identified application installation/removal event identified at Block 210 based on the correlation criteria determined at Block 220 and on a characteristic of the configuration change data records. Where a plurality of application installation/removal events have been identified, operations at Block 230 may include identifying groups of the configuration change data records as being associated with respective ones of the plurality of application installation/removal events. Following the identification of groups at Block 230, the identified groups may be reported to a requesting user.

Further embodiments of the present invention will now be described with reference to the flowchart illustration of FIG. 3. For the embodiments illustrated in FIG. 3, operations begin with an operating system of the computer system generating the configuration change data records (Block 300). For example, an operating system of the computer system may generate the configuration change data records. In some embodiments, a configuration management program generates a portion of the configuration change data to track configuration changes that are not tracked by the operating system. Configuration change data may track, for example, changes including file changes, directory changes and/or registry changes. An initial record of resident applications for use as a historical application record is generated (Block 310). More particularly, as described herein, application control engines 141 typically only track a current installed status of applications on a computer system rather than tracking changes to the applications installed on the computer. Accordingly a previously generated identification of installed software components may be generated as a start point for use in identifying an install/removal event subsequently.

A correlation request is received from a user (Block 320). A user is prompted to provide the correlation criteria (Block 330). In some embodiments, operations at Block 330 include prompting the user for a desired level of risk that an individual configuration change data record will be incorrectly associated with the identified application installation/removal event. The directory tree range criterion, registry key range criterion and/or time period range may be decreased for lower desired level of risk and increased for higher desired levels of risk. For example, a single directory may be associated with the event for a reduced risk of misidentification while an expanded tree (a subtree) of the computer system's directory stricture (tree) may be associated with the event if a user has a greater risk tolerance for incorrect association. While an expanded criteria may increase the risk of an incorrect identification, it similarly may be effective at correctly identifying more of a large quantity of individual configuration change data records as being associated with the event, thereby simplifying an operator's analysis of configuration change data records for the computer system.

An identification of currently installed software components of the computer system in retrieved (Block 340). The retrieved identification of currently installed software components is compared to a previously generated identification of installed software components to identify the application/removal event (Block 350). Note that operations at Block 340 and 350 may be repeatedly carried out responsive to detection of execution of an application install or an application uninstall by the operating system and/or at scheduled times to identify a plurality of application installation/removal events on the computer system. Furthermore, the identification of currently installed software components at Block 340 may include an identification of directory locations of uninstall programs associated with respective installed software components. Ones of the configuration change data records retrieved at Block 300 may similarly include an identification of a directory location and/or a parent of the directory location associated with the respective configuration change data records. Furthermore, in some embodiments, operations at Block 340 for retrieving an identification and at Block 350 for comparing the retrieved identification are carried out at a determinate time. The time is associated with the identified application installation/removal event. In other words, the time of detection of the change in installed software components may be assigned as a corresponding time of the event(s). The configuration change data records retrieved at Block 300 may similarly have an associated time. Furthermore, the correlation criteria determined at Block 330 may include a time period range that may be used in correlating configuration change data to an application installation/removal event.

To update the historical application records initialized at Block 310, the retrieved identification of currently installed software components from Block 340 is saved as a previously generated identification of installed software components for future comparison and identification of events (Block 360).

The plurality of the configuration change data records is automatically identified as being associated with the identified application installation/removal event based on the determined correlation criteria and a characteristic or characteristics of the configuration change data records (Block 370). If additional events have been identified (Block 380), operations at Block 370 are repeated so as to automatically identify groups of the configuration change data records as being associated with respective ones of the plurality of application installation/removal events.

In some embodiments, operations at Block 370 include automatically identifying ones of the configuration change data records having a directory location and/or a parent of the directory location corresponding to the directory location of the uninstall program of the identified application installation/removal event as being associated with the identified application installation/removal event. In some embodiments, operations at Block 370 include automatically identifying ones of the configuration changed data records having an associated time corresponding to the time associated with the identified application installation/removal event. In some embodiments, operations at Block 370 include automatically identifying ones of the configuration change data records having an associated time corresponding to the time associated with the identified installation/removal event as being associated with the identified application installation/removal event. It will be understood that such exemplary comparison operations may utilize time, registry and/or directory ranges as discussed previously.

Methods of correlating computer system configuration change data with application installation or removal events according to various embodiments of the present invention will be now be described further with reference to the flowchart illustration of some embodiments in FIG. 4. As seen in FIG. 4, operations begin at Block 400 by determining whether it is time to update historical application change event data records. In particular, for some embodiments of the present invention, such as described with reference to the Windows® operating system above, installed application data is generally only maintained as a list of currently installed applications. As such, the installed application list does not identify changes, as it includes no historical context. Accordingly, in some embodiments of the present invention, at event and/or time scheduled intervals, a historical record database of application change events maintained by the logic engine may be updated. When an update is scheduled (Block 400), the installed applications list maintained by the operating system is queried to determine a list of currently installed applications (Block 410). It is then determined if the currently installed application list differs from the most recent previous identification of installed applications (Block 420). If changes are detected (Block 420), the applications historical database is updated (Block 430).

Operations according to various embodiments of the present invention utilizing the applications historical database will now be described with reference to Blocks 440 to 470. A user or system administrator correlation request may be received (Block 440). When such a request is received, it initiates operations for correlating configuration change records with application installation/removal events. Correlation criteria are retrieved according to some embodiments of the present invention (Block 450). Such correlation criteria may be established by a user or the like, for example, to provide a desired level of risk that an individual configuration change data record will incorrectly be associated with an application installation/removal event. Such criteria may include, for example, a range of directories to be searched for change events, a time period range to be associated with a particular application installation/removal event and/or the like. In some embodiments, the correlation criterion or criteria may be fixed and determined in advance of receipt of the correlation request at Block 440.

Operations continue with retrieval of a configuration change list and application change information (Block 460). For example, the application change information may be retrieved from the historical record updated at Block 430 and the retrieved information may identify the application event, associated directories, event time information and/or the like. Similarly, the configuration change list may be a general configuration change list of all changes on the computer system maintained by the operating system of the computer system or maintained remotely on a network device communicatively coupled to the computer system.

Configuration changes linked to the application changes are identified based on the retrieved criteria (Block 470). Thus, in some embodiments, the logic engine may utilize the application change data and criteria to generate an appropriate query for use in querying the configuration change list to identify changes meeting the search criteria generated by the logic engine.

By way of example, in many instances, an uninstall program associated with an application is stored in a common directory with some or all of the files or the like which will be changed during installation and/or removal of the application. The historical database record updated at Block 430 may include, in addition to the identification of the application changes, an identification of directories, event time or the like associated with a particular application change. This information may be utilized to identify directories and time ranges of relevance and the configuration change records may identify a change with an included identification of a directory and/or time for each configuration change record. Accordingly, a search to identify a configuration change as linked to an application change at Block 470 may include identifying all configuration changes occurring at or about the same time as the application change event and in a directory or directories associated with the particular application change event.

In addition to the directory associated with the uninstall application, the criteria retrieved at Block 450 may include a designation that the parent and higher level directories and/or the like associated with the directory including the uninstall program be included in the search and that changes to the files in such additional directories also be associated with the application change event. Accordingly, in various embodiments of the present invention, a large number of configuration change data records may be grouped and associated with a single application change event and the group information may be provided to a network administrator for use in evaluating and or debugging changes on the computer system.

While described above primarily with respect to methods implemented using an illustrative particular approach on a Windows® operating system application, such particulars are provided merely by way of example and it will be understood that other embodiments of the present invention may be utilized using different operating systems or alternative approaches on Windows® operating systems. Accordingly, the present invention is not limited to the particular implementation described above. It will be also understood that not only file changes, but directory changes, registry changes and/or the like tracked by the configuration change database may be similarly queried by a logic engine according to various embodiments of the present invention and associated with an application change event or events. Furthermore, while described above primarily with reference to method embodiments, it will be understood that systems and computer program products are also provided.

The block diagram and flowchart illustrations of FIGS. 1-4 illustrate the architecture, functionality, and operations of some embodiments of methods, systems, and computers program products for correlating configuration change data to application installation/removal events. In this regard, each block may represent a module, segment, or portion of code, which comprises one or more executable instructions for implementing the specified logical function(s). It should also be noted that in other implementations, the function(s) noted in the blocks and/or process flows may occur out of the order noted in the figures.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method for correlating configuration change data to an application installation/removal event for a computer system, the method comprising:

retrieving configuration change data records for the computer system, wherein the retrieved configuration change data records are not known to be associated with an application installation/removal event;

identifying the application installation/removal event based on an installed application list of the computer system that identifies currently installed applications on the computer system;

determining correlation criteria;

automatically identifying a plurality of the configuration change data records as being associated with the identified application installation/removal event based on the determined correlation criteria and a characteristic of the configuration change data records; and identifying issues based on the identified configuration change data records that could lead to a problem event in the computer system before the problem event occurs.

2. The method of claim 1, wherein identifying the application installation/removal event comprises:

retrieving an identification of currently installed software components of the computer system; and comparing the retrieved identification of currently installed software components to a previously generated identification of installed software components to identify the application/removal event.

3. The method of claim 2, wherein an operating system of the computer system maintains records of currently installed software components and wherein retrieving an identification comprises retrieving the records of currently installed software components and wherein comparing the retrieved identification is followed by saving the retrieved identification of currently installed software components as the previously generated identification of installed software components.

4. The method of claim 3, the operating system comprises a Windows® operating system and wherein the records of currently installed software components are maintained by an Add/Remove program feature of the operating system.

5. The method of claim 2, wherein the method further comprises an operating system of the computer system generating the configuration change data records.

6. The method of claim 5, wherein the method further comprises a configuration management program generating a portion of the configuration change data to track configuration changes that are not tracked by the operating system.

7. The method of claim 5, wherein the configuration change data tracks changes including file changes, directory changes and/or registry changes.

8. The method of claim 7, wherein the retrieved identification of currently installed software components includes an identification of directory locations of uninstall programs associated with the respective installed software components and wherein ones of the configuration change data records include an identification of a directory location and/or a parent of the directory location associated with the respective ones of the configuration change data records and wherein automatically identifying includes automatically identifying ones of the configuration change data records having a directory location and/or a parent of the directory location corresponding to the directory location of the uninstall program of the identified application installation/removal event as being associated with the identified application installation/removal event.

9. The method of claim 8, wherein retrieving an identification and comparing the retrieved identification are carried out at a time and wherein the time is associated with the identified application installation/removal event and ones of the configuration change data records have an associated time wherein automatically identifying includes automatically identifying ones of the configuration change data records having an associated time corresponding to the time associated with the identified application installation/removal event as being associated with the identified application installation/removal event.

10. The method of claim 9, wherein determining correlation criteria includes determining a time period range to be used in automatically identifying ones of the configuration change data records having an associated time corresponding to the time associated with the identified application installation/removal event as being associated with the identified application installation/removal event.

11. The method of claim 2, wherein identifying the application installation/removal event comprises identifying a plurality of application installation/removal events and wherein retrieving an identification and comparing the retrieved identification are repeatedly carried out responsive to detection of execution of an application install or an application uninstall by the operating system and/or at scheduled times to identify the plurality of application installation/removal events.

12. The method of claim 2, wherein determining correlation criteria includes identifying a directory tree range criterion and/or a registry key tree range criterion to be used in automatically identifying the plurality of configuration change data records, wherein the directory and/or registry tree range criteria comprise directory sub-tree data structure criteria.

13. The method of claim 12, wherein determining correlation criteria includes prompting a user to provide the correlation criteria before automatically identifying the plurality of configuration change data records.

14. The method of claim 13, wherein prompting the user includes prompting the user for a desired level of risk that an individual configuration change data record will incorrectly be associated with the identified application installation/removal event and wherein the directory tree range criterion and/or registry key tree range criterion are decreased for lower desired levels of risk and increased for higher desired levels of risk.

15. The method of claim 2, wherein automatically identifying is preceded by receiving a correlation request from a user and wherein automatically identifying is carried out responsive to the received correlation request.

16. The method of claim 15, wherein identifying the application installation/removal event comprises identifying a plurality of application installation/removal events and wherein automatically identifying comprises automatically identifying groups of the configuration change data records as being associated with respective ones of the plurality of application installation/removal events and wherein automatically identifying is followed by reporting the identified groups to the user.

17. A computer system including a processor configured to carry out the method of claim 16.

18. A computer program product for correlating configuration change data to an application installation/removal event for a computer system, the computer program product comprising computer program code embodied in a non-transitory computer readable medium, the computer program code comprising program code configured to carry out the method of claim 16.

19. A computer system for correlating configuration change data to an application installation/removal event for a computer system, comprising:
a configuration change database stored on a memory coupled to the computer system that includes a plurality of configuration change data records for the computer system, ones of which track changes on the computer system, wherein the plurality of configuration change data records are not known to be associated with an application installation/removal event;
an installed application list stored on a memory coupled to the computer system that identifies currently installed applications on the computer system;
an applications historical database stored on a memory coupled to the computer system that includes identifications of application install/removal events for the computer system over a period of time;
correlation criteria for use in correlating the configuration change data records with the application install/removal events;
an application control engine executing on a processor of the computer system that is configured to install and/or remove applications and to update the installed application list; and
a logic engine executing on a processor of the computer system that is configured to generate the identifications of application install/removal events based on the installed application list and to identifying a plurality of the configuration change data records as being associated with the identified application installation/removal events based on the correlation criteria and a characteristic of the configuration change data records and identify issues based on the identified configuration change data records that could lead to a problem event in the computer system before the problem event occurs.

20. A computer program product for correlating configuration change data to an application installation/removal event for a computer system, the computer program product comprising:
a non-transitory computer-readable storage medium having computer-readable program code embodied in said medium, said computer-readable program code comprising:
computer-readable program code that retrieves configuration change data records for the computer system, wherein the retrieved configuration change data records are not known to be associated with an application installation/removal event;
computer-readable program code that identifies the application installation/removal event based on an installed application list of the computer system that identifies currently installed applications on the computer system;
computer-readable program code that determines correlation criteria;
computer-readable program code that automatically identifies a plurality of the configuration change data records as being associated with the identified application installation/removal event based on the determined correlation criteria and a characteristic of the configuration change data records; and
computer-readable program code that identifies issues based on the identified configuration change data records that could lead to a problem event in the computer system before the problem event occurs.

* * * * *